United States Patent [19]

John et al.

[11] Patent Number: 6,041,276

[45] Date of Patent: Mar. 21, 2000

[54] DEVICE FOR CONTROLLING A STARTING PROCEDURE

[75] Inventors: Thomas John, Alitzheim; Thomas Kuhn, Bad Kissingen; Wolfgang Nehse, Reichling/Ludenhausen, all of Germany

[73] Assignees: Mannesman Sachs AG, Schweinfurt; BMW AG, München, both of Germany

[21] Appl. No.: 08/992,981

[22] Filed: Dec. 18, 1997

[30] Foreign Application Priority Data

Dec. 21, 1996 [DE] Germany ............................ 196 53 855

[51] Int. Cl.$^7$ ...................................................... F16D 48/08
[52] U.S. Cl. .............................. 701/67; 701/82; 180/197; 477/176
[58] Field of Search ............................. 701/67, 82, 87, 701/70; 180/197; 192/31; 477/77, 78, 175, 176, 180

[56] References Cited

U.S. PATENT DOCUMENTS

| | | | |
|---|---|---|---|
| 4,766,544 | 8/1988 | Kurihara et al. | 701/67 |
| 4,796,718 | 1/1989 | Thielen et al. | 180/197 |
| 5,020,622 | 6/1991 | Hrovat | 180/197 |
| 5,107,430 | 4/1992 | Magnino | 701/83 |
| 5,176,234 | 1/1993 | Reik et al. | 192/0.052 |

FOREIGN PATENT DOCUMENTS

| | | |
|---|---|---|
| 0 240 283 | 3/1987 | European Pat. Off. . |
| 44 09 122 | 2/1995 | Germany . |
| 196 09 878 | 9/1996 | Germany . |
| 2 250 331 | 6/1992 | United Kingdom . |
| 2 299 144 | 9/1996 | United Kingdom . |

*Primary Examiner*—Michael J. Zanelli
*Attorney, Agent, or Firm*—Cohen, Pontani, Lieberman & Pavane

[57] ABSTRACT

A device for controlling a starting procedure of a motor vehicle for initiating a movement of the motor vehicle includes a controller which receives as input, signals generated by an engine shaft speed sensor, a driving speed sensor, a transmission shaft speed sensor, a transmission output shaft speed sensor, and an accelerator pedal position sensor. The controller is operatively connected to the engine for increasing the engine speed above a minimum threshold value when the driver signals his desire for a racing start. The controller is also operatively connected to a clutch activation device for deliberately producing a slip of the driving wheels and for controlling the slip of the driving wheels by controlling a slip of the clutch after a starting time point signaled by the driver.

22 Claims, 7 Drawing Sheets

Fig.5  racing start
(Breaking off control by time threshold)

Fig.6

Fig. 7 racing start (Exceeding frictional work threshold)

Fig.10 Falling below a lower transmission shaft speed threshold value

Fig.11

Fig.12 Exceeding a maximum differential speed

Fig.13

DEVICE FOR CONTROLLING A STARTING PROCEDURE

BACKGROUND OF THE INVENTION

1. Field of the Invention

The present invention relates to a device for controlling the starting procedure of a motor vehicle for initiating a motion of the motor vehicle. More specifically, the present invention relates to a device for controlling a racing start of a motor vehicle for implementing a start with the maximum possible acceleration.

2. Description of the Related Art

Starting procedures for motorized vehicles are already known from German reference DE 196 09 878 A1. That document discloses a starting procedure that is divided into several phases. The first phase calls for the acceleration of the engine. In the next phase, the friction clutch is engaged, so that the engine shaft and the transmission shaft have the same speed. As this starting procedure progresses, the engine shaft speed is deliberately preset as a function of time.

Another prior art German reference DE 44 09 122 A1 also discloses a device for regulating a starting procedure. This device regulates the starting procedure in two phases. In the first phase, a beginning speed of a clutch shaft is guided to a predetermined speed. In the second phase, a differential between the beginning speed of the clutch shaft and the output speed of the vehicle is guided along a predetermined course toward zero, at which point the clutch is fully closed.

This device of DE 44 09 122 A1 for regulating a starting procedure comprises a throttle valve as a power adjustment for the vehicle motor and an automatic friction clutch which is automatically operated by an actuator. The device controls the actuator of the clutch by a predetermined signal which takes into consideration at least the position of the throttle valve and the changes over time of the throttle valve position.

The starting procedures of the above references are disadvantageous in that each of the starting procedures is controlled, at least partially, by the activation of the engine, so that if the power demand changes, an intervention in engine operation is required to provide the demanded power. Because of the required intervention in engine operation, there is always a time delay, and thus a reaction inertia, in this process for controlling the starting procedure. In starting procedures such as racing starting procedures, where maximum possible vehicle acceleration is the goal, this time delay and reaction inertia prevents optimal acceleration.

SUMMARY OF THE INVENTION

The object of the invention is to provide a device for controlling a starting procedure, whereby the vehicle is driven with the maximum possible vehicle acceleration during a racing start.

According to the invention, the engine is controlled to increase the speed of the engine at the beginning of the starting procedure when the friction clutch is still open and the vehicle is standing still. The desired engine shaft speed is achieved extraordinarily rapidly because less inertial mass has to be accelerated when the friction clutch is open. The vehicle motion is started with a deliberate production of slip in the vehicle driving wheels, so that the vehicle starts up with maximum acceleration. To produce the desired slip of the driving wheels, the control device controls the automatic friction clutch to engage with a large moment transmitted to the driving wheels to deliberately cause the wheels to slip. The slip is detectable, for example, based on the difference between the vehicle speed and the speed of the driving wheels, or based on a speed differential of the driving wheels relative to the non-driven wheels. Once this slip state is established, the slip of the driving wheels is deliberately controlled as a function of vehicle speed. Providing slip for the driving wheels allows a start-up with especially high vehicle acceleration to be achieved.

It has proved advantageous for the driver to signal his desire for a racing start to the control device by producing an activation gradient of an accelerator pedal that is greater than a preset racing start gradient.

In one embodiment, a racing start switch is provided. The driver signals his desire for a racing start by activating this switch. This prevents the driver from unknowingly signalling for a racing start by inadvertently activating the accelerator pedal above a racing start gradient for a brief time. The use of such a racing start switch may also be required when the activation gradient has already been used for signalling other starting processes and the driver, by suitable activation, thus consciously selects a starting procedure other than the racing start. The racing start switch can be integrated in an existing switch, whereby one position of the switch is associated with the racing start.

Moreover, when a racing start is initiated by the racing start switch, activation of the accelerator pedal above a lower accelerator pedal activation threshold value may also be required for the initiation of the desire for a racing start. This further requirement for signalling a desired racing start makes erroneous operation of the race start by the driver virtually impossible.

The racing start switch enables the driver to signal his desire for a racing start to the control device at an early stage, before the actual starting time point. The control device then implements the steps needed for a racing start when the vehicle is standing still, thus placing the vehicle into a waiting state with immediate starting readiness. If the driver then signals a desired starting time point, no additional warm-up time is needed, and the vehicle accelerates immediately in the desired racing manner. This starting procedure is an especially suitable selection for quick starts at stoplights.

To signal a desired racing start and starting time point, the driver first moves the racing start switch from a first activation position into a second activation position. As stated above, a minimum deflection of the accelerator pedal above a lower accelerator pedal activation threshold value may also be required to signal the desire for a racing start. The starting time point is subsequently signalled to the control device by the movement of the racing start switch from the second activation position into the first activation position. The detection of an accelerator pedal deflection above a preset upper accelerator pedal threshold value may also be required, so that the vehicle starts in the desired manner when the desired starting time point is signalled. The requirement for two necessary conditions for the timing point time signal prevents accidental signalling of the starting time point, which avoids dangerous driving situations resulting from improper operation of the vehicle in traffic. At the actual starting time point, the driver, having already switched the racing start switch to the first activation position, needs only to activate the accelerator pedal in the usual manner.

In another embodiment, the driver signals his desire for a racing start by briefly activating the racing start switch, while the starting time point is identified by the deflection of the accelerator pedal above the upper accelerator pedal activation threshold value. Thus, at the desired starting time point, the driver needs only to activate the accelerator pedal. Because the driver desires a racing start, he finds it natural to deflect the accelerator pedal rapidly and far. When the starting procedure is initiated in this manner, it is not necessary to retrain the driver to signal a starting time point. Also, minimal coordination between the racing start switch to be operated and the accelerator pedal activation is required.

The torque transmitted to the driving wheels via the slip of the friction clutch may be optionally regulated, so that there is no intervention in engine operation during the racing start.

Further, the device may be optionally equipped for controlling a starting procedure with an overload protection device, for preventing excessive load from damaging the motor vehicle, especially on the friction clutch.

If an overload situation is detected, the racing start procedure is interrupted and control of the vehicle is transferred to a normal starting routine procedure that is stored in the control device. In this manner, automatic vehicle operation is continued ensuring an uninterrupted starting procedure.

When an overload situation is detected, it is also possible to intervene by regulating the engine operation. This can be especially useful, for example, when the engine speed exceeds an upper limit value due to uncontrollable external conditions such as, for example, a slippery road. In such cases, it is sufficient to regulate the engine speed downward by changing a choke flap position, and to continue the racing start with the modified choke flap position. Since the clutch operates with a slip during the racing start procedure, a maximum duration of the racing start procedure may be optionally limited by the overload protection device. The time measurement begins upon the signalling of the starting time point or, in the case of the racing start device without a racing start switch, at the onset of the frictional engagement of the friction clutch. In this way, the maximum time span during which the clutch is operated with slip is limited, thus protecting the clutch from damage.

The overload protection device may also intervene during an ongoing racing start procedure after the expiration of an intermediate time interval if the engine speed exceeds an upper limit value, the transmission shaft speed lies below a preset threshold value, or the differential speed between the engine shaft and the transmission shaft exceeds a preset value. Under these conditions, the racing start procedure is terminated prematurely or intervention, especially by regulating engine operation, occurs. Such operating situations are caused by external circumstances that are unsuitable or unfavorable for the implementation of a racing start such as, for example, slippery roads or heavily loaded vehicles, especially an axle load resting on the drive axle.

Furthermore, the device for controlling the starting procedure optionally includes a transmission actuator. This enables acceleration over a large speed range in the racing mode, whereby the driving gears are automatically shifted as a function of operating parameters. Using the transmission actuator, it is possible to remain in the racing start procedure until a predetermined speed limit is reached. Further, it has proved advantageous to provide the automatic shifting of gears as a function of driving wheel speed. If driving wheel speed deviates sharply from vehicle speed, the racing start shifting procedure is prevented and the racing start procedure is terminated. A gear change under normal conditions may then be carried out. It is thereby possible to regulate the engine within a speed range dependent on the engaged gear, in that, during slip, the moment transmitted via the friction clutch is provided independent of accelerator pedal activation, due to the inertial mass of the engine. During gear changes, the engine speed drops when the clutch engages and the slip decreases. Not until the engine speed falls below a preset engine speed limit, which exceeds the transmission speed, is the engine again controlled by engine operation to provide moment. If the driving wheel speed deviates sharply from the driving speed, temporary intervention into engine operation to reduce the moment provided by the engine is also possible during a gear shift while continuing the racing start procedure.

In a device for controlling the racing start which does not have an automatic transmission, it is necessary for the driver to shift gears at the proper time. Either the correct time for shifting gears is signalled to the driver by the system through a signalling device such as a tachometer, or it is presumed that the driver recognizes the need to shift gears on the basis of the engine noise and his driving experience. However, it is also conceivable to limit the racing start to the speed range in which no shifting of gears is necessary.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

Figure 1:
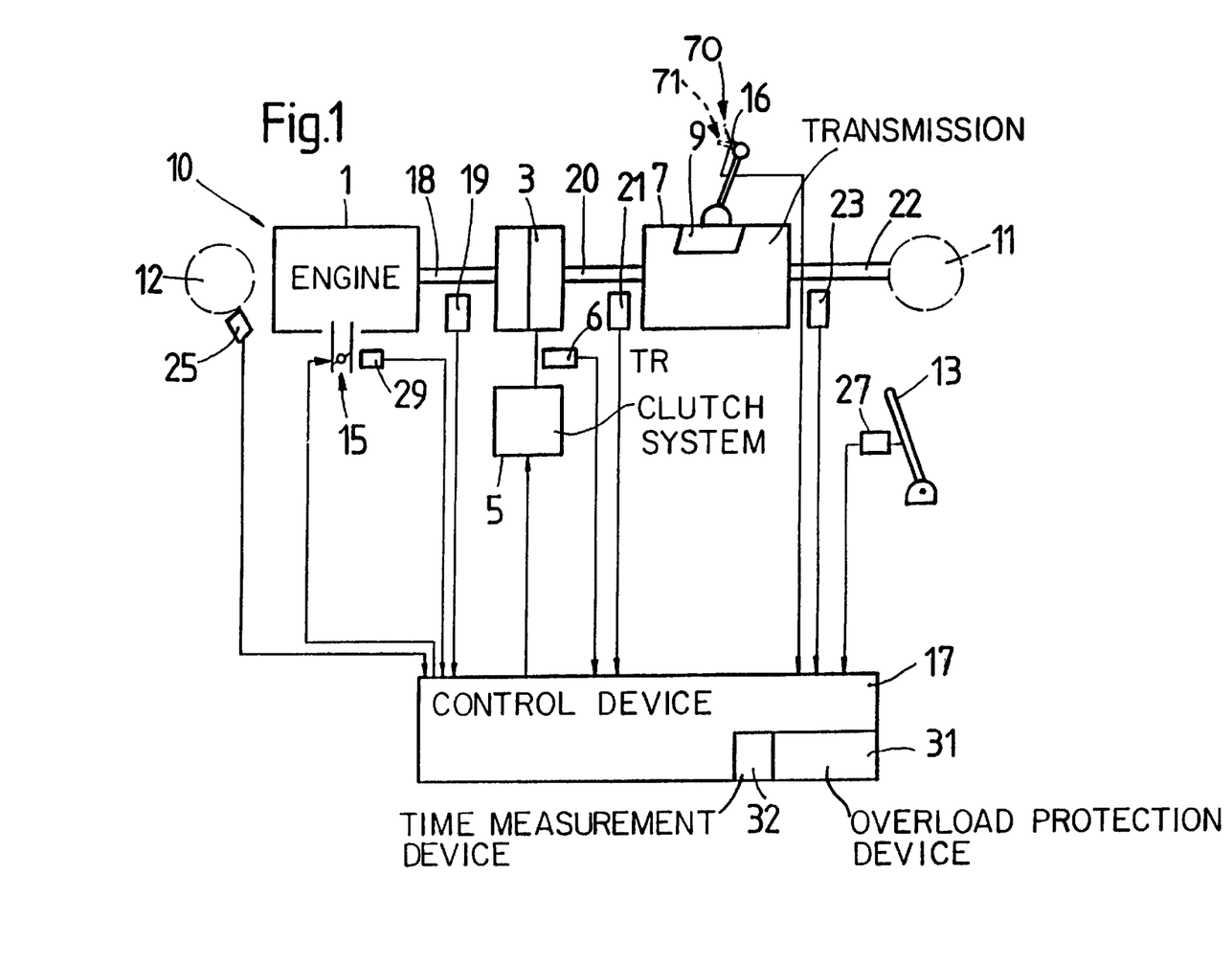
FIG. 1 shows a schematic depiction of an embodiment of a device for controlling a racing start of the present invention.

With reference to FIG. 1, the basic structure of the device for controlling a racing start procedure for a motor vehicle is described. A drive arrangement 10 for the vehicle (the vehicle is not shown) includes an internal combustion engine 1 for driving the vehicle. An engine shaft 18 is connected between the engine 1 and a friction clutch 3. The friction clutch 3 is operatively connected to an electronic clutch system 5 for automatic activation of the friction clutch 3. The clutch system 5 includes a clutch sensor 6 for sensing the degree of engagement and the amount of slip between friction surfaces of the clutch. The output shaft of the clutch 3 is a transmission shaft 20 that is connected to a transmission 7. A transmission actuator 9 enables automatic shifting between the gears of the transmission 7. A transmission output shaft 22 is connected to a drive wheel 11 of the vehicle.

To control the drive arrangement 10, a controller or control device 17 is signally connected for receiving signals of an accelerator pedal sensor 27, which detects a position of an accelerator pedal 13, a driving speed sensor 25, which senses a speed of a non-driven wheel 12, an engine shaft speed sensor 19, which senses the speed of the engine shaft 18, a transmission shaft speed sensor 21, which senses the speed of transmission shaft 20, a transmission output shaft speed sensor 23, which senses the speed of the transmission output shaft 22, and the signals of a racing start switch 16. Depending on the received signals (which preferably also include the signals of a choke flap sensor 29 of a choke flap 15 associated with the internal combustion engine 1), the control device 17 controls the electronic clutch system 5, the transmission actuator 9 and the internal combustion engine 1.

Figure 2:
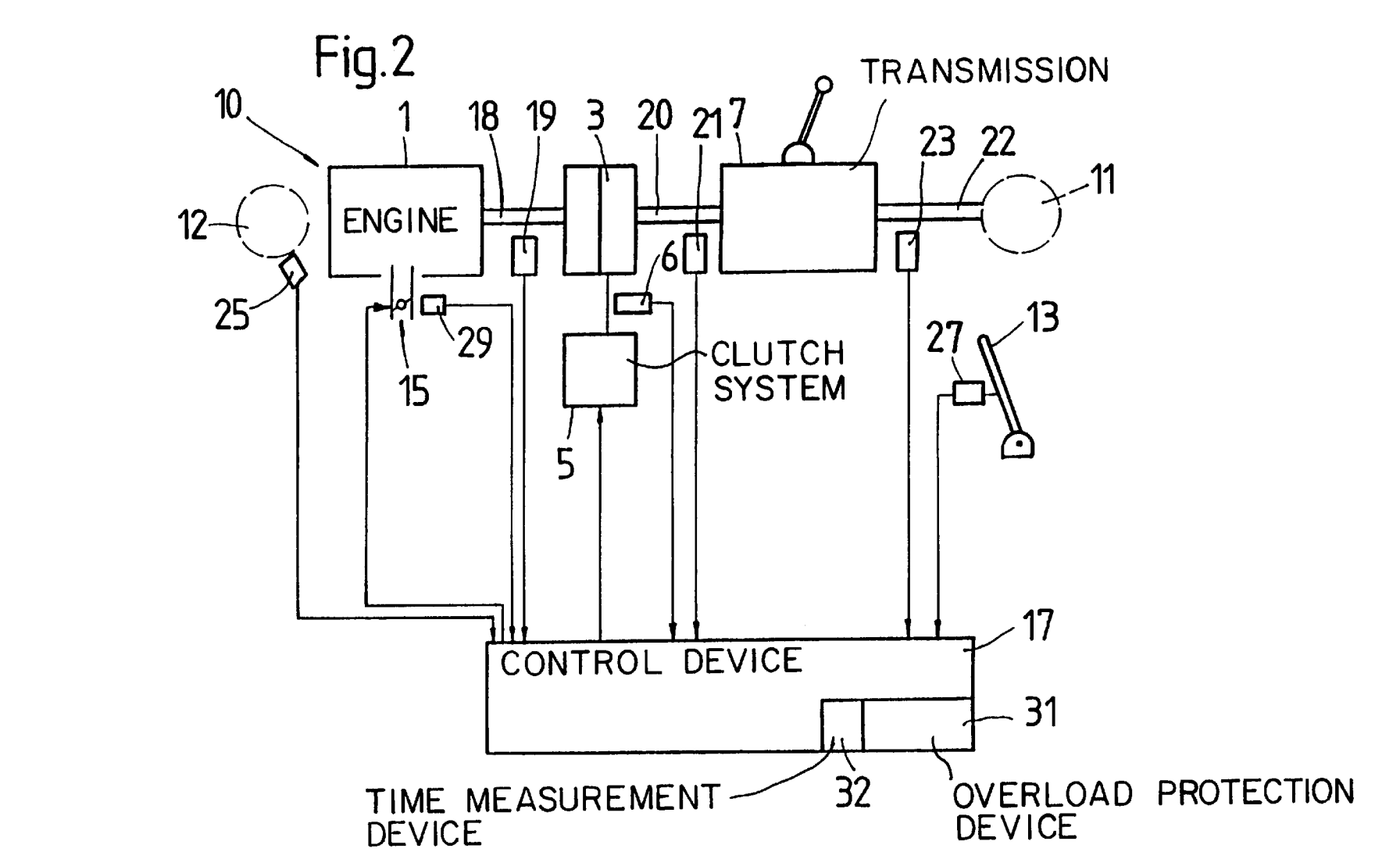
FIG. 2 shows a schematic depiction of another embodiment of a simplified device for controlling a racing start of the present invention.

The drive arrangement 10 shown in FIG. 2 does not include racing start switch 16 to signal a desired racing start. In this embodiment a desired racing start is recognized via the accelerator pedal portion sensor 27. For example, referring momentarily to FIG. 3, if the accelerator pedal 13 is deflected so as to exceed an upper accelerator pedal activation threshold value 47 with an activation gradient 49 that lies above a racing start gradient 43, then the control device 17 recognizes the desire of the driver for implementing a racing start procedure.

Figure 3:
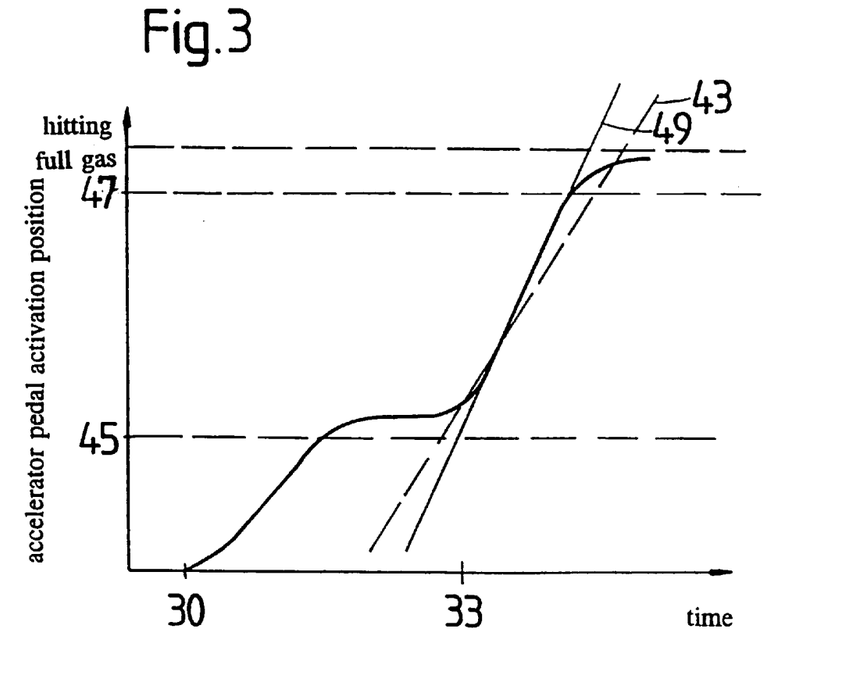
FIG. 3 is a graph of accelerator pedal activation versus time during the initiating of a racing start procedure.

Referring to FIGS. 1 and 3, the function of the racing start is described in what follows. The drive arrangement 10 has the racing start switch 16 and/or the accelerator pedal 13, operable by the driver to signal his desire for a racing start. In one embodiment, for signalling a desire for the racing start procedure, the racing start switch 16 is moved out of a first activation position 70, which is also the rest position of the racing start switch 16, to a second activation position 71.

After switching the racing start switch 16, the accelerator pedal 13 is then deflected to exceed a lower accelerator pedal activation threshold value 45. After detecting the two steps of switching the racing start switch 16 and the deflection of the accelerator pedal 13, the control device 17 recognizes the desire of the driver for implementing the racing start procedure. During the initiation of racing start procedure, with an open friction clutch 3, control device 17 controls the internal combustion engine 1 such that the engine speed exceeds a lower engine speed threshold value 35 and waits for a starting time point signal. The driver then signals a desired starting time point 33 by releasing the racing start switch 16, so that this switch 16 again assumes the first activation position 70 which is detected by the control device 17. Activation of the accelerator pedal 13 above an upper accelerator pedal activation threshold value 47 may also be required in combination with releasing the racing start switch for signalling the desired starting time point 33.

Other operations or sequences of operation of the racing start switch 16 and the accelerator pedal 13 may also be used for signalling a desired racing start signal. For example, it is possible for the driver to activate the racing start switch 16 briefly when the vehicle is standing still, and for the accelerator pedal 13, at this time or shortly thereafter, to be deflected above the lower accelerator pedal activation threshold value 45. As a result, the control device 17 recognizes the driver's desire for a racing start and initiates the racing start when the clutch is still open, as described above. To signal the desired starting time point 33, the driver must then deflect the accelerator pedal 13 with an activation gradient 49 of the accelerator pedal 13 that lies above the racing start activation gradient 43, so as to exceed an upper accelerator pedal activation threshold value 47.

Figure 4:
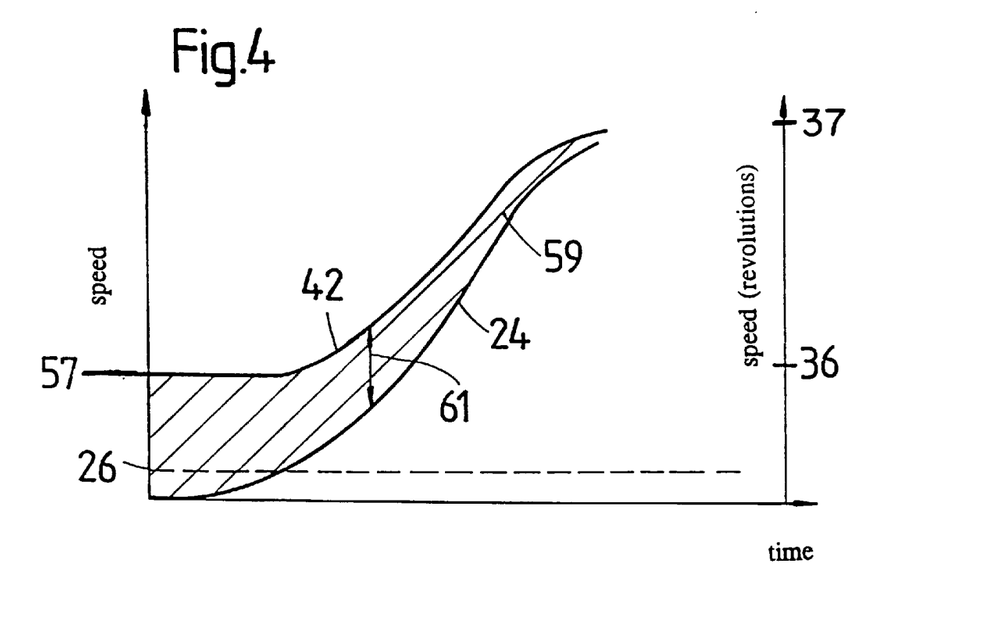
FIG. 4 is a graph of slip control of the friction clutch versus time for a racing start.

Referring also to FIG. 4, when the starting time point 33 is recognized by the control device 17, the friction clutch 3 is briefly closed completely or almost completely to transmit a high moment to a driving wheel 11 for producing a slip 59 of the driving wheel 11. If a slip state of the driving wheel 11 has been established (which can be determined by comparing a speed 42 of the driving wheel 11 to a speed of a non-driven wheels 12 or to a vehicle speed 24), then the slip 59 of the driving wheels 11 is controlled via activation of the friction clutch 3. To retain an existing slip value 61 of the driving wheels 11, a lesser torque is needed than to establish the same value, so that the friction clutch 3 is operated increasingly with slip 59. Only a portion of the torque initiated by the internal combustion engine 1 that is required to produce the slip 59 is transmitted via the friction clutch 3 to the driving wheels 11. The portion of surplus torque not converted into heat in the friction clutch 3 causes the engine speed to increase. If the vehicle speed 24 lies below a preset driving speed limit value 26 during the racing start procedure, then a constant speed 57 of the driving wheels 11 or a constant transmission output shaft speed 36 is preferably controlled by the control device 17. When this preset vehicle limit speed 26 is exceeded, the control device 17 establishes a slip value 61 dependent on vehicle speed, which decreases as the vehicle speed 24 increases. When an upper vehicle speed limit 37 is exceeded, the friction clutch is completely closed, so that the racing start procedure is successfully terminated. Only after the racing start procedure ends does the control device 17 intervene in engine operation to regulate the internal combustion engine 1 downward, as needed.

A racing start may be prematurely terminated if the accelerator pedal activation falls below the upper accelerator pedal activation threshold value 47. Furthermore, the racing start may also be terminated upon detection of an overload situation. After the racing start procedure is terminated, a new racing start is possible only after expiration of a preset minimum time period or after a preset minimum distance has been travelled.

FIGS. 5–13 show operational situations where a termination of the racing start procedure is performed because an overload situation 65 is detected. To detect an overload situation 65, the control device 17 includes an overload protection device 31, through which excessive load on the drive arrangement 10, especially the friction clutch 3, is prevented. If excessive load is detected by the overload protection device 31, this device terminates the racing start procedure. The clutch 3 is closed and, if still necessary, a normal starting gear is proceeded in. If the vehicle has already accelerated sufficiently, normal driving operation is continued by the control device 17.

Moreover, a racing start procedure will not be permitted or will be terminated if an already damaged clutch is or has been detected through a comparison of the engine shaft speed gradient with the transmission shaft speed gradient.

The overload protection device 31 is described in greater detail as follows. The overload protection device 31 comprises a time measurement device 32, which begins time measurement at the starting time point 33 or, in the system without the racing start switch 16, at the beginning of the racing start procedure. Several operating conditions are described below in which a detection of the overload situation 65 is necessary to ensure a suitable useful life of the drive arrangement 10.

Figure 5:
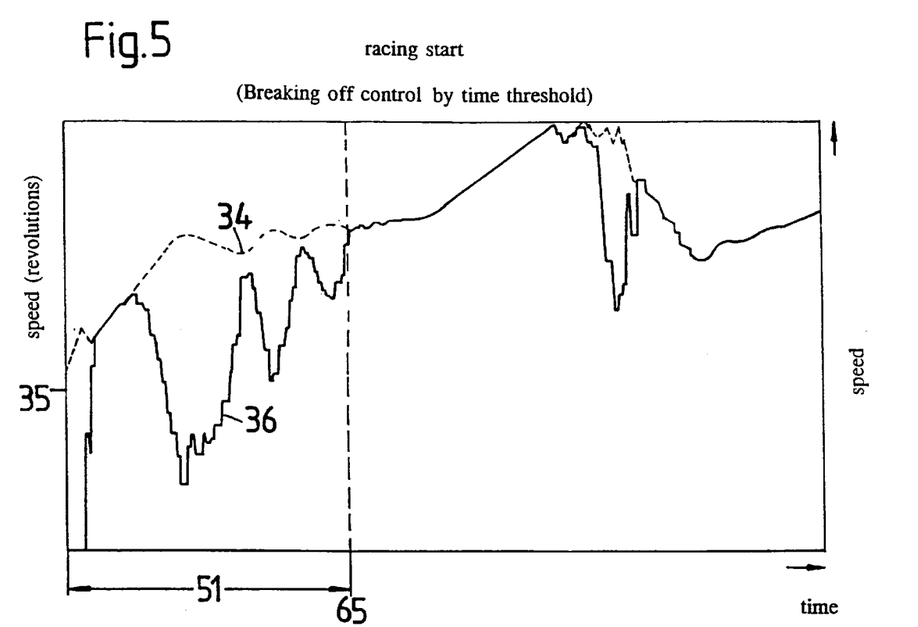
FIG. 5 is a graph showing an operating situation where a preset maximum time for a racing start is exceeded.
Figure 6:
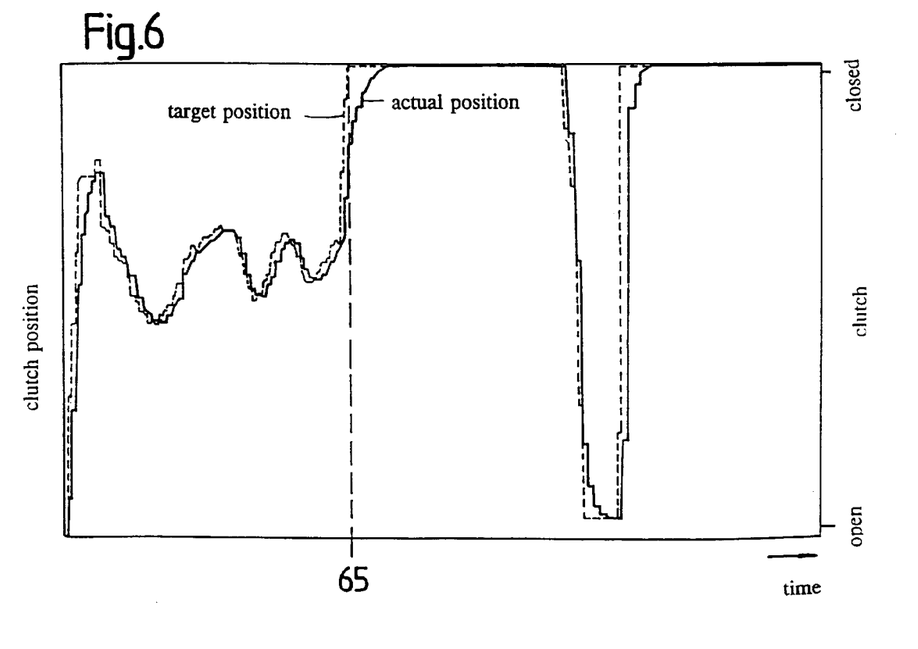
FIG. 6 is a graph showing clutch control for the operating situation of FIG. 5.

Referring to FIGS. 5 and 6, if the racing start procedure has not ended after expiration of a maximum racing start time interval 51, the racing start procedure is terminated. This is performed to protect the friction clutch 3, in which heat loss accrues to a great extent due to the frictional work of the engaged friction surfaces. During the racing start procedure, the friction clutch 3 is operated almost continuously with slip and thus subjected to a heavy load. In particular, high heating of the friction surfaces can lead to their destruction, which must be prevented. When the racing start procedure is terminated, the friction clutch 3 is immediately closed, as shown in FIG. 6.

Figure 7:
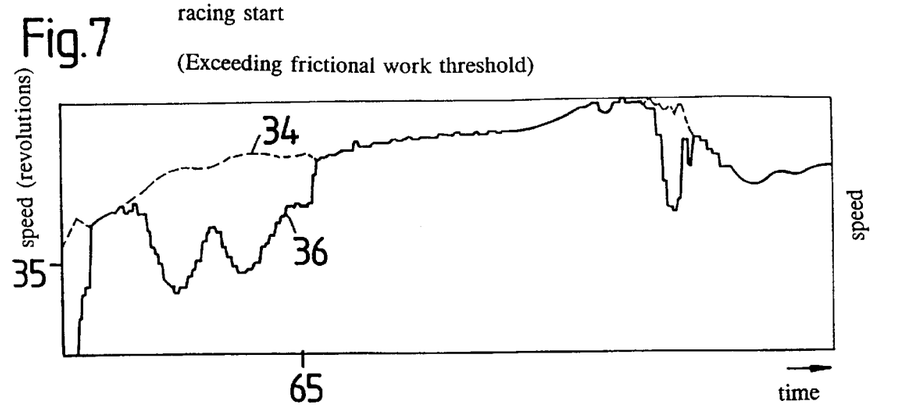
FIG. 7 is a graph showing another operating situation where the frictional work threshold is exceeded during the racing start procedure.
Figure 8:
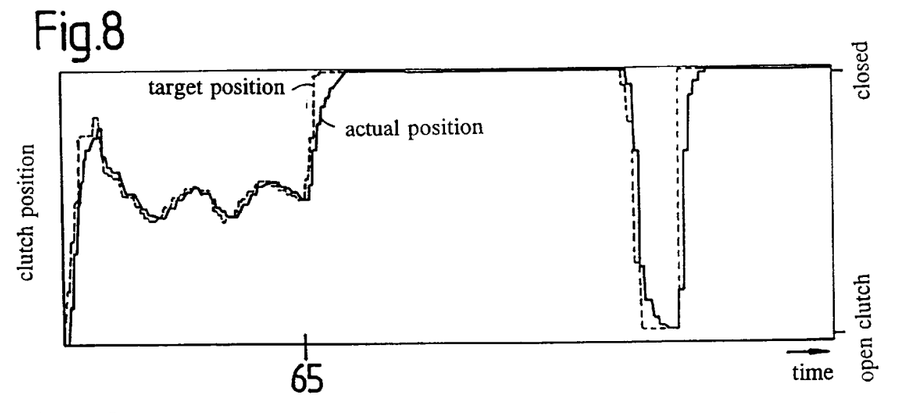
FIG. 8 is a graph showing clutch control for the operating situation of FIG. 7.
Figure 9:
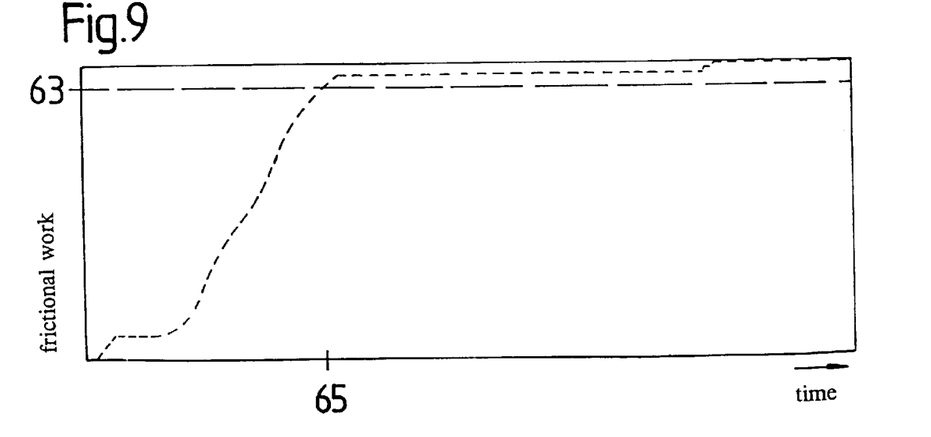
FIG. 9 is a graph showing frictional work for the operating situation of FIG. 7.

Referring to FIGS. 7–9, the racing start procedure is also terminated to protect the friction clutch 3 when a preset frictional work threshold value 63 is exceeded. The frictional work threshold value 63 is determined from the engine moment and the measured slip value of the driving wheels 11 by the overload protection device 31 or the control device 17.

Another possible overload situation 65 is that of an engine shaft speed 34 that exceeds an upper engine speed threshold value 37 (see FIG. 4). Such high speeds can be caused by a slippery road. Only a slight torque is needed to drive the driving wheels 11 with the predetermined slip 59 in that condition. As a result, the friction clutch 3 is operated with greater slip and a larger amount of the torque generated by the internal combustion engine 1 is available to increase the speed of the engine 1. Taking this operating situation into account, the internal combustion engine 1 and, in particular, the friction clutch 3 operated with large slip, are protected from potential damage in this condition by terminating the racing start procedure when the engine shaft speed exceeds the upper engine speed threshold value.

Figure 10:
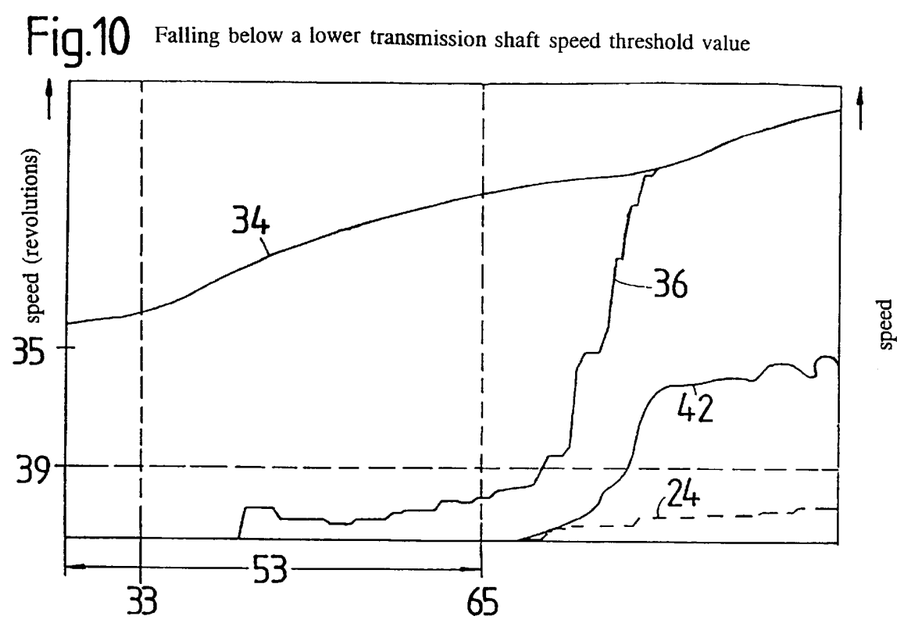
FIG. 10 is a graph showing another operating situation where the transmission shaft speed falls below a threshold value during the racing start procedure.
Figure 11:
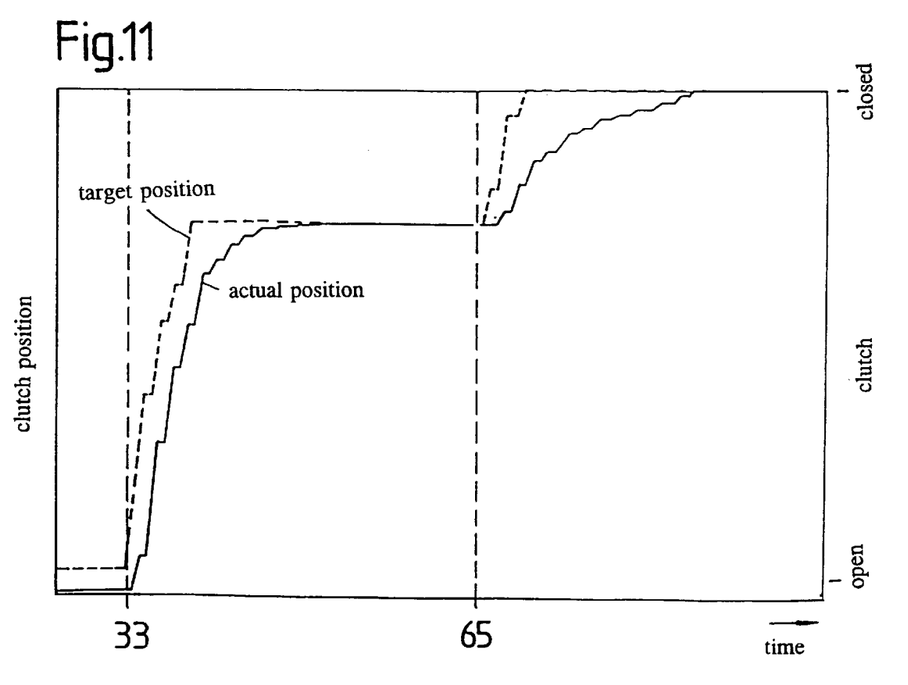
FIG. 11 is a graph showing clutch control for the operating situation of FIG. 10.

Referring to FIGS. 10–11, another possible overload situation 65 exists when, after the expiration of an intermediate interval 53, the speed of the driving wheels 42 falls below a minimum speed or the transmission shaft speed 36 falls below a threshold value 39. This may be caused, for example, by a high axle load or a heavily laden vehicle. Under these conditions, extremely fast acceleration of the vehicle is not possible, and thus a racing start does not make sense. Under such operating conditions, an initiated racing start will be terminated.

Figure 12:
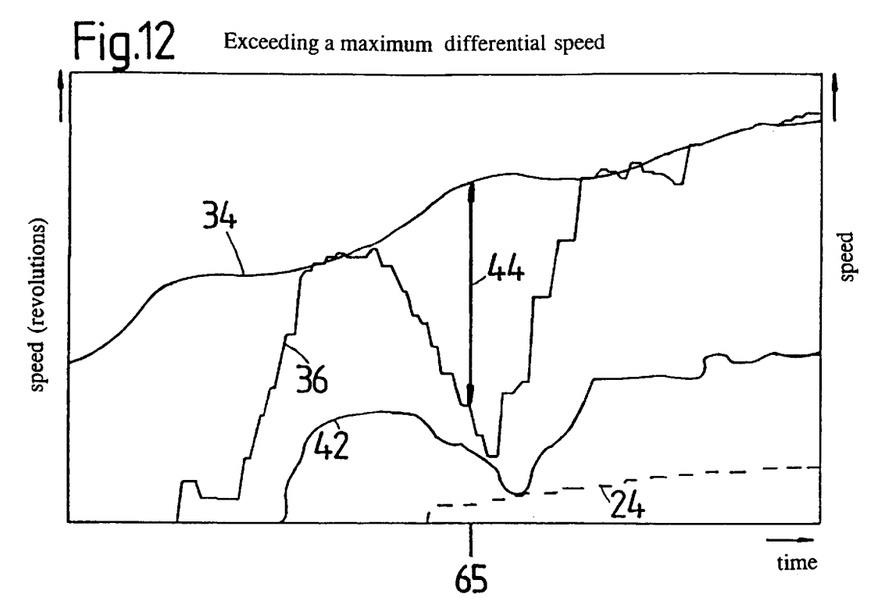
FIG. 12 is a graph showing yet another operating situation where a maximum differential speed between an engine shaft and transmission shaft is exceeded during the racing start procedure.
Figure 13:
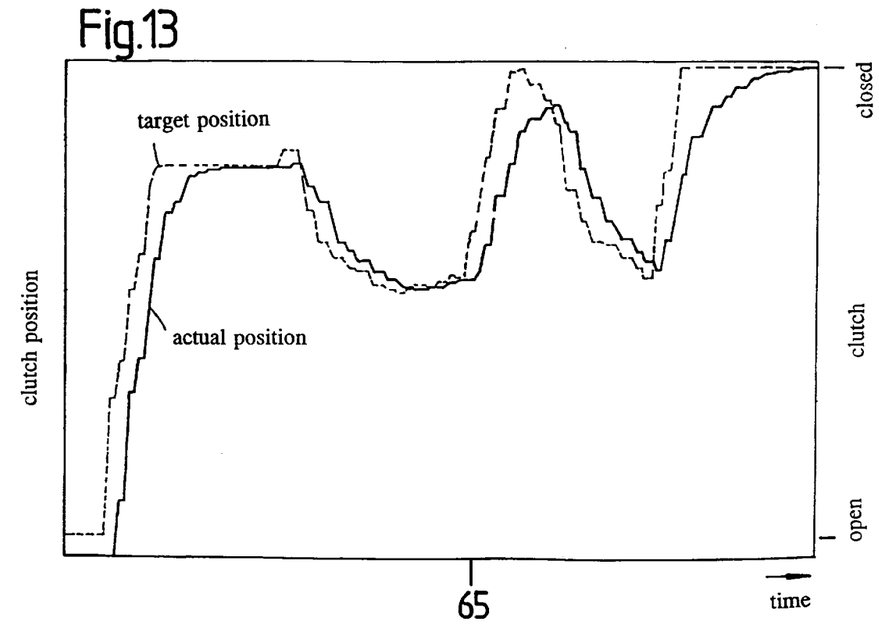
FIG. 13 is a graph showing clutch control for the operating situation of FIG. 12.

Referring to FIGS. 12 and 13, yet another possible overload situation 65 is that of a high differential speed 44 between the engine shaft speed 34 and the transmission shaft speed 36 exceeding a preset limit value after expiration of the intermediate time interval 53. A high differential speed 44 can be caused by a slippery road or a high engine shaft speed 34 at the starting time point 33. Preferably, the friction clutch 3 is closed in a preset manner, e.g., linearly. If, before the friction clutch is completely closed, it is determined that the overload situation no longer exists, then the slip provided during the racing start procedure is again activated. The reactivation of the racing start procedure is also depicted in FIGS. 12 and 13.

The limit and threshold values used to control the starting procedure can be stored in the control device 17 as well as in the overload protection device 31. As applicable, the control device 17 makes use of limit and threshold values stored in the overload protection device 31, and vice versa.

The invention is not limited by the embodiments described above which are presented as examples only but can be modified in various ways within the scope of protection defined by the appended patent claims.

We claim:

1. A device for controlling a starting procedure of a motor vehicle by controlling an automatic friction clutch of the motor vehicle, comprising:

a controller operatively connected for receiving signals from an engine shaft speed sensor, a vehicle speed sensor, a transmission shaft speed sensor, a transmission output shaft speed sensor, and an accelerator pedal position sensor;

a racing start device operatively connected to said controller for generating a racing start desire signal and a starting time point signal in response to an input from a user of the motor vehicle;

said controller operatively connected to an engine of said motor vehicle for producing an engine speed above a minimum engine speed threshold value in response to said racing start desire signal; and said controller operatively connected to the automatic friction clutch for controlling the automatic friction clutch to produce a first slip of the drive wheels of the motor vehicle and to produce a second slip of the automatic friction clutch in response to said starting time point signal, said controller also operatively connected to the automatic friction clutch for controlling a magnitude of said first slip in response to a speed of the motor vehicle during said starting procedure.

2. The device for controlling a starting procedure of claim 1, wherein said racing start device is operatively connected to said accelerator pedal position sensor for generating said racing start desire signal when an accelerator pedal of the motor vehicle is depressed with an activation gradient which lies above a preset racing start gradient stored in said controller.

3. The device for controlling a starting procedure of claim 1, wherein said racing start device comprises a racing start switch movable between a first position and a second position by the operator of said motor vehicle; and said racing start device operatively connected to said racing start switch for generating said racing start desire signal when said racing start switch is in said first position.

4. The device for controlling a starting procedure of claim 3, wherein said racing start device is operatively connected to said racing start switch and said accelerator position sensor for generating said racing start desire signal after said racing switch is positioned in said first position and said accelerator position sensor senses a deflection of an accelerator pedal greater than a lower accelerator threshold value.

5. The device for controlling a starting procedure claim 3, wherein racing start device is operatively connected to said racing start switch for generating said starting point signal when said racing start switch is moved from said first position to said second switch position.

6. The device for controlling a starting procedure of claim 5, wherein said racing start switch is operative for automatically returning to said second position, whereby the user of the motor vehicle must hold said racing start switch in said first position until said starting point signal is desired by the user, whereby said starting point signal is generated when said driver releases said racing start switch from said first position.

7. The device for controlling a starting procedure of claim 3, wherein said racing start device is operatively connected to said racing start switch and said accelerator pedal position sensor for generating said racing start desire signal in response to a brief positioning of the racing start switch in said first position and an accelerator pedal of the motor vehicle being deflected greater than a lower accelerator pedal activation threshold value; and said racing start device is operatively connected to said accelerator pedal position sensor for generating said starting time point signal in response to said accelerator pedal being deflected greater than an upper accelerator pedal activation threshold value.

8. The device for controlling a starting procedure of claim 1, wherein said controller is operatively connected to the automatic friction clutch for controlling a slip value of the driving wheels in response to a speed of said motor vehicle.

9. The device for controlling a starting procedure of claim 8, wherein said controller is operatively connected to said automatic friction clutch for controlling a moment transmitted to the driving wheels during said starting procedure by operation of said friction clutch only.

10. The device for controlling a starting procedure of claim 1, wherein said controller is operatively connected to said automatic friction clutch for producing a slip of the driving wheels by first briefly closing said automatic friction clutch and for establishing a slip value of the driving wheels dependent on a driving speed of the motor vehicle by operating the automatic friction clutch with increasing slip, so that only a portion of a force moment generated by the engine that is required to set the slip value of the driving wheels is transmitted to the driving wheels.

11. The device for controlling a starting procedure of claim 1, wherein said controller comprises an overload protection device operatively connected for preventing an overload of the friction clutch by terminating the starting procedure in response to a detected overload.

12. The device for controlling a starting procedure of claim 11, wherein said controller is operatively connected for continuously controlling the motor vehicle using a second starting procedure stored in the controller when said starting procedure is terminated in response to said overload.

13. The device for controlling a starting procedure of claim 1, wherein said controller comprises an overload protection device operatively connected for detecting an overload situation and for briefly intervening the starting procedure by operating the engine in response to said overload situation.

14. The device for controlling a starting procedure of claim 11, wherein said overload situation comprises an engine speed greater than a preset upper engine speed threshold value.

15. The device for controlling a starting procedure of claim 11, wherein said overload protection device comprises a time interval detection device for detecting a time interval initiated by said starting time point signal; and said overload protection device operatively connected for terminating said starting procedure after said time interval exceeds a preset racing start time interval stored in the overload protection device.

16. The device for controlling a starting procedure of claim 11, wherein said overload situation comprises a speed of a transmission shaft of the motor vehicle that lies below a preset threshold value after the expiration of an intermediate time interval which starts at the starting time point signal.

17. The device for controlling a starting procedure of claim 11, wherein said overload comprises a differential speed of the engine relative to the transmission shaft that lies above a preset differential speed value after the expiration of an intermediate interval which starts at the starting time point signal.

18. The device for controlling a starting procedure of claim 17, wherein said controller is operatively connected for closing the friction clutch in response to said overload situation until the differential speed falls below the preset difference.

19. The device for controlling a starting procedure of claim 11, wherein said overload situation comprises a frictional work of said automatic friction clutch exceeding a preset frictional work threshold, wherein said controller is operatively connected for determining said frictional work of the automatic friction clutch by said transmission shaft speed sensor and said engine shaft speed sensor.

20. The device for controlling a starting procedure of claim 1, wherein said controller is operatively connected to a gear actuator of a transmission of said motor vehicle for automatically shifting between driving gears during said starting procedure.

21. The device for controlling a starting procedure of claim 20, wherein said controller is operatively connected to said transmission for initiating a gear shift in said transmission in response to a speed of the driving wheels and a speed of the motor vehicle.

22. The device for controlling a starting procedure of claim 1, further comprising a clutch activation system for the automatic activation of the friction clutch having a clutch activation housing and a transmission actuator for automatically changing gears of said transmission having a transmission actuator housing, wherein said control device is mounted in one of said clutch activation housing and said transmission actuator housing.

* * * * *